(12) United States Patent
Shizu

(10) Patent No.: US 10,302,511 B2
(45) Date of Patent: May 28, 2019

(54) COGGING TORQUE MEASURING METHOD FOR MOTOR

(71) Applicant: OKUMA Corporation, Niwa-gun, Aichi (JP)

(72) Inventor: Tatsuya Shizu, Aichi (JP)

(73) Assignee: OKUMA CORPORATION, Aichi (JP)

( * ) Notice: Subject to any disclaimer, the term of this patent is extended or adjusted under 35 U.S.C. 154(b) by 0 days.

(21) Appl. No.: 14/963,958

(22) Filed: Dec. 9, 2015

(65) Prior Publication Data

US 2016/0169755 A1 Jun. 16, 2016

(30) Foreign Application Priority Data

Dec. 9, 2014 (JP) .................................. 2014-249309

(51) Int. Cl.
*G01L 3/10* (2006.01)
*G01L 5/26* (2006.01)
*G01L 3/24* (2006.01)

(52) U.S. Cl.
CPC ................. *G01L 3/10* (2013.01); *G01L 3/242* (2013.01); *G01L 5/26* (2013.01)

(58) Field of Classification Search
CPC .............. G01L 3/10; G01L 5/26; G01L 3/242
See application file for complete search history.

(56) References Cited

U.S. PATENT DOCUMENTS 3,657,923 A * 4/1972 Wildi ........................ G01L 3/22
73/862.17
3,891,908 A * 6/1975 Porras .................... F16K 31/046
318/434

(Continued)

FOREIGN PATENT DOCUMENTS

CN 101581257 A 11/2009
EP 2651028 A1 10/2013
(Continued)

OTHER PUBLICATIONS

JPO Decision of Rejection corresponding to JP Application No. 2014-249309; dated Sep. 4, 2018.

(Continued)

*Primary Examiner* — Harshad R Patel
*Assistant Examiner* — Tran M. Tran
(74) *Attorney, Agent, or Firm* — Cantor Colburn LLP

(57) ABSTRACT

A method for determining a cogging torque may include applying a substantially constant rotation torque to an output shaft of a motor without electrically energizing the motor; detecting, an angle of rotation of the output shaft of the motor at each of a plurality of angles of rotation; calculating an angular acceleration of the motor at each of the plurality of angles of rotation by second order differentiating the angle of rotation; calculating a measured torque value at each of the plurality of angles of rotation by multiplying the angular acceleration by a moment of inertia of a rotor in the motor; obtaining a measured torque waveform of the measured torque value at each of the plurality of angles of rotation as a function of the plurality of angles of rotation; and calculating a cogging torque waveform based on a frequency of the measured torque waveform.

3 Claims, 3 Drawing Sheets

(56) References Cited

U.S. PATENT DOCUMENTS

| | | | | |
|---|---|---|---|---|
| 4,457,165 | A * | 7/1984 | Wiederrich | G01L 5/0095 73/115.05 |
| 4,581,923 | A * | 4/1986 | Nitao | G01M 15/044 702/141 |
| 5,218,860 | A * | 6/1993 | Storar | G01M 15/044 318/490 |
| 5,404,108 | A * | 4/1995 | Storar | G01R 31/34 318/490 |
| 5,440,915 | A * | 8/1995 | Storar | G01L 5/26 73/9 |
| 5,505,078 | A * | 4/1996 | Storar | G01L 5/26 73/114.15 |
| 6,326,750 | B1 * | 12/2001 | Marcinkiewicz | H02P 6/10 318/432 |
| 6,591,200 | B1 * | 7/2003 | Cohen | G01L 3/00 324/160 |
| 6,738,718 | B2 * | 5/2004 | Kurnia | H02P 21/22 702/41 |
| 7,044,003 | B2 * | 5/2006 | Flammer | G01L 5/26 73/862.26 |
| 7,089,806 | B2 * | 8/2006 | Flammer | G01L 3/00 73/862.08 |
| 7,474,067 | B2 * | 1/2009 | Ueda | H02P 21/05 318/400.23 |
| 7,610,799 | B2 * | 11/2009 | Sugita | F02D 41/1497 73/114.15 |
| 7,958,779 | B2 * | 6/2011 | Nagano | F02D 41/0097 73/114.15 |
| 8,058,828 | B2 * | 11/2011 | Lin | H02P 6/10 318/128 |
| 8,437,915 | B2 * | 5/2013 | Endo | H02P 6/10 701/41 |
| 8,505,374 | B1 * | 8/2013 | Arseneau | G01L 3/24 73/116.05 |
| 8,688,358 | B2 * | 4/2014 | Sano | F02D 35/023 123/435 |
| 8,704,469 | B2 * | 4/2014 | Tadano | H02P 21/05 318/400.02 |
| 9,255,856 | B2 * | 2/2016 | Takahashi | G01L 5/24 |
| 2005/0011288 | A1 | 1/2005 | Flammer et al. | |
| 2009/0282903 | A1 | 11/2009 | Nagano et al. | |
| 2012/0065903 | A1 * | 3/2012 | Overberg | B04B 1/2016 702/41 |
| 2016/0139002 | A1 * | 5/2016 | Akiyama | G01M 13/025 73/115.01 |
| 2017/0191903 | A1 * | 7/2017 | Komada | H02K 15/02 |

FOREIGN PATENT DOCUMENTS

| | | |
|---|---|---|
| JP | 52051985 A | 4/1977 |
| JP | 05149803 A | 6/1993 |
| JP | 11-258076 A | 9/1999 |
| JP | 2005037389 A | 2/2005 |
| JP | 2006220497 A | 8/2006 |
| JP | 2010158123 A | 7/2010 |
| WO | 2013186871 A1 | 12/2013 |

OTHER PUBLICATIONS

International Search Report corresponding to Application No. PCT/JP2012/065116; dated Sep. 18, 2012.
JP Notice of Grounds for Rejection corresponding to Application No. 2014-249309; dated May 8, 2018.
Chinese First Office Action corresponding to Application No. 2015109046950; dated Nov. 28, 2018.

* cited by examiner

COGGING TORQUE MEASURING METHOD FOR MOTOR

PRIORITY INFORMATION

This application claims priority to Japanese Patent Application No. 2014-249309 filed on Dec. 9, 2014, the entire disclosure of which is incorporated herein by reference.

TECHNICAL FIELD

The present invention relates to an apparatus for measuring a cogging torque of a motor.

BACKGROUND ART

Cyclic torque pulsation that occurs as a rotor is rotated under a condition where a motor is not energized is caused by the interaction between an iron core and permanent magnets, and is referred to as cogging torque. When a motor having high cogging torque is used, for example, to drive a feed shaft of a machine tool, defects such as creation of moiré will occur. For this reason, there is demand for a motor of lower cogging torque.

However, the amplitude of cogging torque typically has a very small value that, for example, accounts for only 1% of a continuous rated torque of the motor in the machine tool or less, and measurement of the cogging torque is difficult. Conventionally, various suggestions have been put forth about a method for measuring the cogging torque of a motor.

For example, JP 2006-220497 A discloses a cogging torque measuring method by means of a torque meter. The cogging torque measuring method is specifically described with reference to FIG. 5. FIG. 5 shows a schematic configuration of a cogging torque measuring apparatus. A cogging torque measuring apparatus 41 includes a driving motor 50 functioning as a drive means for rotating a motor 42 to be measured, a torque meter 51 functioning as a torque detection means, and an encoder 52 functioning as a rotation angle detecting means. An output shaft 42a of the motor 42 to be measured is connected through a first coupling 43 to a rotating shaft 51a of the torque meter 51 in an integrally rotatable manner, and the rotating shaft 51a of the torque meter 51 is further connected through a second coupling 44 to an output shaft 50a of the driving motor 50 in an integrally rotatable manner. The driving motor 50 is actuated based on a command from a controller 54, to thereby rotate, via the second coupling 44, the torque meter 51, and via the first coupling 43, the motor 42 to be measured in a non-energized state. Then, the torque meter 51 detects a torque generated in the motor 42 to be measured and outputs a torque detection signal corresponding to the detected torque. The encoder 52, which is mounted on the driving motor 50, measures an angle of rotation of a not-illustrated drive shaft of the driving motor 50 to detect an angle of rotation of the motor 42 to be measured, and outputs to the controller 54 an angle detection signal corresponding to the detected angle. The controller 54 determines, based on both the torque detection signal input via a filter 53 from the torque meter 51 and the angle detection signal input from the encoder 52, the cogging torque of the motor 42 to be measured.

Meanwhile, JP 2010-158123 A discloses a method for measuring a cogging torque, in which a value obtained by second order differentiation of an angle of rotation of a rotor while a motor is rotated is multiplied by a moment of inertia of the rotor. This method for measuring a cogging torque is described specifically with reference to FIG. 6. FIG. 6 is a block diagram of a cogging torque detecting apparatus. The cogging torque detecting apparatus 61 includes an inverter 71, a motor 72 to be measured, an encoder 73 functioning as a rotation angle detecting unit, and a dedicated controller 64 functioning as a control apparatus for the motor 72. In this method, an angle of rotation, which is detected by the encoder 73 when the motor 72 is driven through the inverter 71 at a constant torque, is second order differentiated in an angular acceleration calculating unit 81 to find a rotation angular acceleration, and in a multiplier 93, the rotation angular acceleration is multiplied by a moment of inertia 92 of the rotor in the motor 72 to be measured, to thereby calculate a cogging torque.

In the previously-described measuring method shown in JP 2006-220497 in which the driving motor 50 is connected via the torque meter 51 to the motor 42 to be measured, the moment of inertia of the driving motor 50 is required to be much higher than that of the motor 42 to be measured, for measurement of the cogging torque with accuracy. The reason for this is described using mathematical expressions below. An acceleration for a change in velocity caused by the cogging torque of the motor 42 to be measured is taken as a, a moment of inertia of the rotating shaft in the driving motor 50 is taken as Jd, and an output torque of the driving motor 50 is taken as Td. The torque detection signal St output from the torque meter 51, which indicates the sum of the cogging torque transmitted from the motor 42 to be measured through the torque meter 51 to the driving motor 50 and the output torque Td of the driving motor 50, is expressed by Equation (1) (in the equations below, a friction torque of the rotating shaft and a moment of inertia of the torque meter are not taken into account) as follows:

$$St = Jd \cdot \alpha + Td \qquad (1)$$

Taking into account the acceleration $\alpha$, which is obtained as $\alpha$=(a torque exerted on the rotating shaft)/(the moment of inertia of the rotating shaft), Equation (2) is obtained for the acceleration $\alpha$ as follows:

$$\alpha = (Tcog - Td)/(Jm + Jd) \qquad (2)$$

where Jm indicates the moment of inertia of the motor 42 to be measured, and Tcog indicates the cogging torque of the motor 42 to be measured.

Here, assuming a condition of Td=Tcog, the acceleration $\alpha$ in Equation (2) becomes zero. Substituting this value of $\alpha$ in Equation (1) yields St=Td=Tcog. In this case, the cogging torque can be accurately measured by measuring the torque detection signal output from the torque meter 51. The condition of Td=Tcog, however, is a condition where the change in velocity caused by the cogging torque of the motor 42 to be measured is completely cancelled by controlling the velocity of the driving motor 50. In practice, it is almost impossible to actually establish the condition, and a failure to establish the condition inevitably invites an error in measurement. A way of making the torque detection signal St as close to the cogging torque Tcog as possible is described below. Substitution of Equation (2) into Equation (1) yields the following Equation (3).

$$S_t = J_d \cdot \frac{T_{cog} - T_d}{J_m + J_d} + T_d = \frac{J_d}{J_m + J_d} \cdot T_{cog} + \frac{J_m}{J_m + J_d} \cdot T_d \qquad (3)$$

From Equation (3), it can be understood that St≈Tcog is obtained when both conditions Jd/(Jm+Jd)≈1 and Jm/(Jm+Jd)≈0 are satisfied. To achieve this, Jd should be much greater than Jm.

From the above, it is proved that the moment of inertia Jd of the driving motor 50 needs to be sufficiently greater than the moment of inertia Jm of the motor 42 to be measured in order to perform accurate measurement of the cogging torque. For this reason, when a cogging torque of a large motor is measured, it is necessary that the installed driving motor 50 be much larger than the motor 42 to be measured. This results in a problematic increase in size of a measurement apparatus.

On the other hand, in the measuring method disclosed in JP 2010-158123, because a current is passed through the motor 72 to be measured, a torque pulsation component caused by the passage of the current is also measured together with the cogging torque. This raises a problem that it is not possible for the measuring method to solely measure the cogging torque.

SUMMARY

A cogging torque measuring apparatus according to the present invention is an apparatus for measuring a cogging torque of a motor, that includes a drive mechanism for rotatively driving an output shaft of the motor without energizing the motor, a rotation angle detector for detecting an angle of rotation of the motor, an angular acceleration calculating unit for second order differentiating the angle of rotation to calculate an angular acceleration of the rotor, a torque calculating unit for multiplying the angular acceleration by a moment of inertia of a rotor in the motor to calculate a torque, and a signal processing unit for determining, based on both the angle of rotation detected by the rotation angle detector and the torque calculated by the torque calculating unit, a waveform of a cogging torque for the angle of rotation.

In an aspect of the present invention, the drive mechanism is a mechanism in which the output shaft of the motor to be rotated is rotated by pulling a wire wound around the output shaft of the motor. The drive mechanism may be a mechanism for manually rotating the output shaft of the motor. Alternatively, the drive mechanism may be a mechanism in which the output shaft of the motor is rotated by a direct drive motor attached to the output shaft of the motor.

According to the present invention, the cogging torque can be accurately measured with a small measuring apparatus even when the cogging torque of a large motor is measured. In addition, because no current is passed through the motor to be measured, occurrence of torque pulsation caused by a current can be prevented, which allows the measuring apparatus to solely measure the cogging torque.

BRIEF DESCRIPTION OF THE DRAWINGS

The present invention will be further described with reference to the accompanying drawings, wherein like reference numerals refer to like parts in the several views, and wherein.

DESCRIPTION OF THE EMBODIMENTS

<Embodiment 1>

Figure 1:
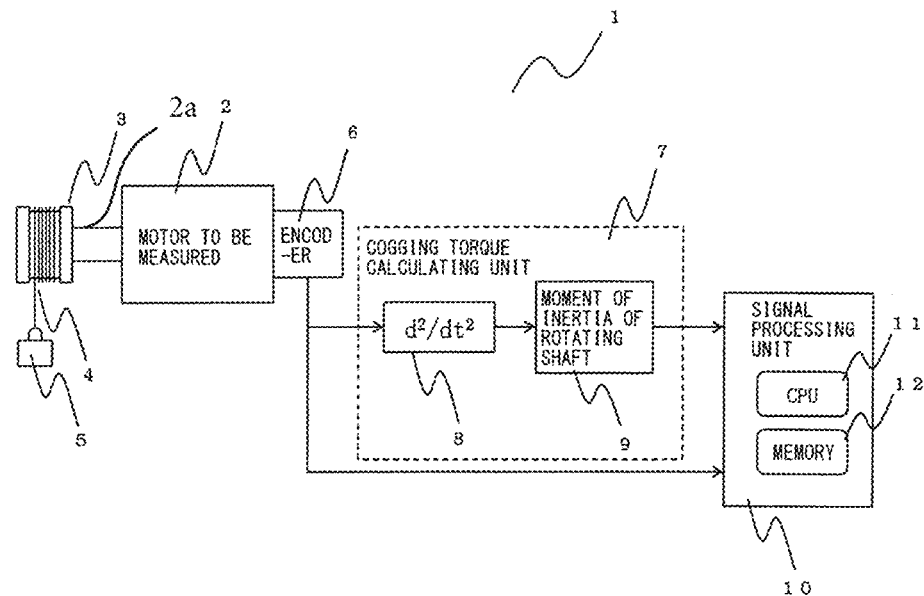
FIG. 1 shows a schematic configuration of a cogging torque measuring apparatus according to a first embodiment of the present invention.

FIG. 1 is shows a schematic configuration of a cogging torque measuring apparatus 1 according to a first embodiment of this invention. As shown in FIG. 1, the cogging torque measuring apparatus 1 includes a pulley 3 mounted, as a drive means for rotating a motor 2 to be measured, on an output shaft 2a of the motor 2 to be measured, a wire 4 having one end attached to the pulley in a state where the wire 4 can be taken up around the pulley 3 and the other end suspended along a vertical direction, a pendant weight 5 suspended from the other end of the wire 4, an encoder 6 functioning as a rotation angle detecting means, a cogging torque calculating unit 7, and a signal processing unit 10. The cogging torque calculating unit 7 consists of an angular acceleration calculating unit 8 and a torque calculating unit 9. The angular acceleration calculating unit 8 performs second order differentiation of an angle of rotation detected by the encoder 6 to calculate an angular acceleration. The torque calculating unit 9 multiplies the angular acceleration calculated in the angular acceleration calculating unit 8 by a known moment of inertia of the rotating shaft, to find a torque. Meanwhile, the signal processing unit 10 consists of a central processing unit (CPU) 11 and a memory 12. The central processing unit 11 has a function of reading from the memory 12 a program for analyzing a frequency of a cogging torque waveform and executing the program, while the memory 12 is composed of a ROM in which the program for analyzing the frequency of the cogging torque waveform is stored, or a RAM in which data such as detection data are rewritably stored.

Figure 2:
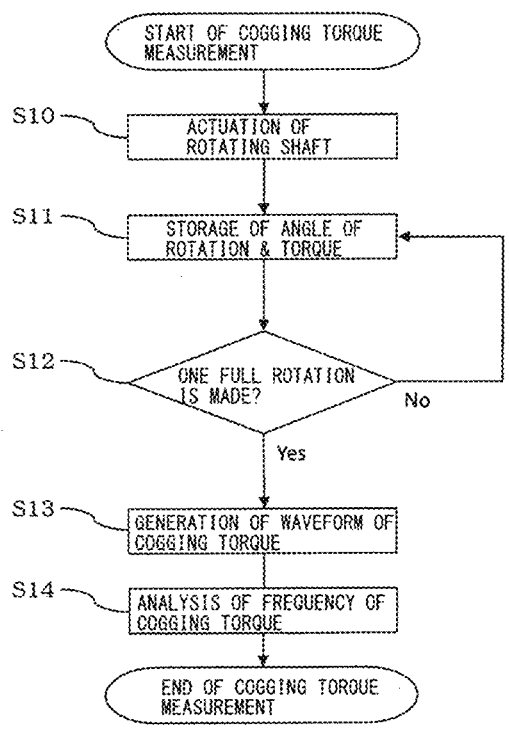
FIG. 2 is a flowchart of a cogging torque measuring method according to the present invention.

Next, procedural steps for measuring a cogging torque will be described with reference to FIG. 2. Firstly, in step 10, the rotating shaft of the motor 2 to be measured is rotatively actuated. Specifically, the weight 5 is selected so as to provide a load greater than a static frictional torque of the rotating shaft of the motor 2 to be measured, and attached to one end of the wire 4 which is wound around the pulley 3. A constant torque is exerted from the load of the weight 5 onto the rotating shaft of the motor 2 to be measured, which causes the rotating shaft to rotate with a constant angular acceleration.

Then, in step 11, both an angle of rotation of the motor 2 to be measured detected by the encoder 6 and the torque calculated in the cogging torque calculating unit 7 are stored in the memory 12.

Subsequent to this, whether or not the rotating shaft has made one full rotation is determined in step 12. Whether the one full rotation is made by the rotating shaft is determined based on whether a difference between the angle of rotation initially stored after cogging torque measurement is started and a present angle of rotation reaches or exceeds 360 degrees. When it is not determined that the rotating shaft has made one full rotation, operation moves back to step 11 to store both the angle of rotation of the motor 2 to be measured and the torque in the memory 12 again. These steps are repeated until the rotating shaft of the motor 2 to be measured makes one full rotation. Here, the cogging torque having any cycle can be measured. Although it is still preferable to measure the cogging torque for one full rotation of the rotating shaft, measurement may not necessarily be performed to obtain the cogging torque for the one full rotation, and measurement of the cogging torque may be performed, when a cogging torque cycle is known, for example, to obtain the cogging torque at least for an angle of rotation corresponding to a value obtained by dividing 360 degrees by the cogging torque cycle.

Then, after the rotating shaft of the motor 2 to be measured makes the one full rotation, a waveform of the cogging torque is created, in step 13, on a graph having the torque calculated in the torque calculating unit 9 on the vertical axis and the angle of rotation on the horizontal axis based on the data recorded in the memory 12. Next, in step 14, frequency analysis is performed on the created waveform of the cogging torque to calculate a component for each order of rotation.

As opposed to the cogging torque measurement method described in JP 2006-220497 A, the motor to be measured is not connected, in this embodiment, via a torque meter to a driving motor. This can prevent the necessity of maintaining the moment of inertia of the driving motor much greater than that of the motor to be measured so that the torque detection signal output from the torque meter is matched with the cogging torque as described in the BACKGROUND ART section. As a result, the cogging torque can be measured with accuracy in a smaller measuring apparatus. On the other hand, as distinct from the cogging torque measuring method described in JP 2010-158123 A, no current is passed through the motor to be measured, which makes it possible to solely measure the cogging torque.

Note that the means for driving the motor 2 to be measured is not limited to the above-described means, and may be implemented, for example, by the wire 4 which is directly wound around the output shaft of the motor 2 to be measured. Further, a way of pulling the wire 4 is not limited to that described above, and may be implemented differently; for example, as described below. A not-illustrated wire taking up motor is separately arranged, and a pulley is coupled to an output shaft of the wire taking up motor. Then, an end of the wire 4 is attached to the pulley coupled to the output shaft of the wire taking up motor, to thereby allow the motor 2 to be measured to be driven when the wire 4 is pulled by rotating the wire taking up motor. Here, the wire taking up motor is not required to cause constant-velocity rotation of the motor to be measured, which can eliminate the necessity of the moment of inertia of the driving motor to be sufficiently greater than that of the motor to be measured, and, in turn, allows accurate measurement of the cogging torque with the smaller measurement apparatus.

<Embodiment 2>

Figure 3:
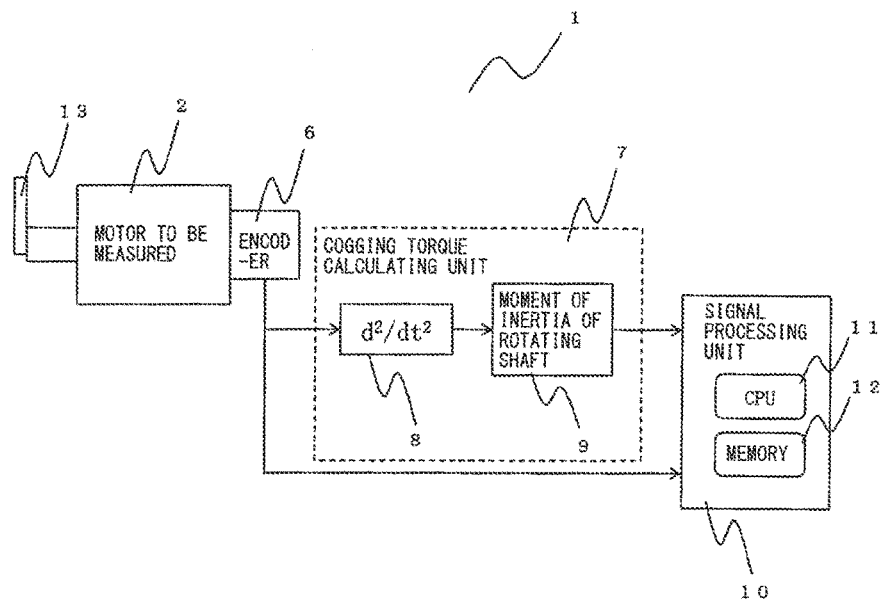
FIG. 3 shows a schematic configuration of a cogging torque measuring apparatus according to a second embodiment of the present invention.

FIG. 3 schematically shows components used in a cogging torque measuring method for a motor according to a second embodiment of this invention. In the second embodiment, the cogging torque can be measured with a measuring apparatus whose structure is simpler than that in the first embodiment.

Referring to FIG. 3, the cogging torque measuring method according to the second embodiment is described below. The same components as those of the first embodiment are designated by the same reference numerals as those of the first embodiment, and the descriptions related to the components will not be repeated. A point different from the first embodiment is that a handle 13 is mounted on the output shaft of the motor 2 to be measured, and the means for driving the rotating shaft of the motor 2 to be measured is implemented by manually turning the handle 13. Here, it is preferable that manual operation of turning the handle 13 is performed with the intention of simply giving a rotary force without performing any manipulation such as an aim of giving a constant rate of rotation. Application of a force other than the rotary force to the output shaft can cause the cogging torque to be attenuated or amplified, which hampers accurate measurement of the cogging torque. The procedural steps for measuring the cogging torque other than that associated with the means for driving the output shaft are identical with those in the first embodiment, and descriptions thereof are not repeated.

It should be noted that the way of manually turning the output shaft implemented as the means for driving the motor 2 to be measured is not limited to the above-described way, and the output shaft may be directly grasped by a hand to manually rotate the output shaft of the motor 2 to be measured.

<Embodiment 3>

Figure 4:
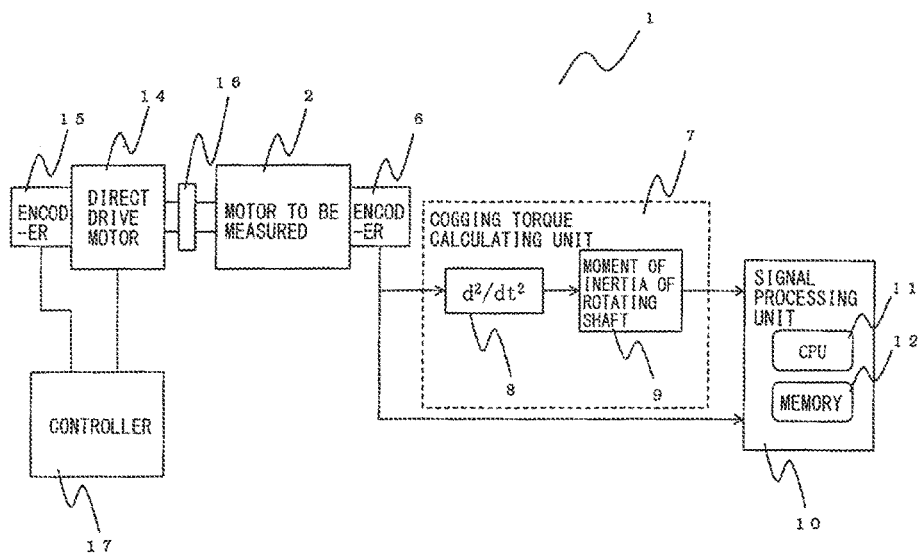
FIG. 4 shows a schematic configuration of a cogging torque measuring apparatus according to a third embodiment of the present invention.
Figure 5:
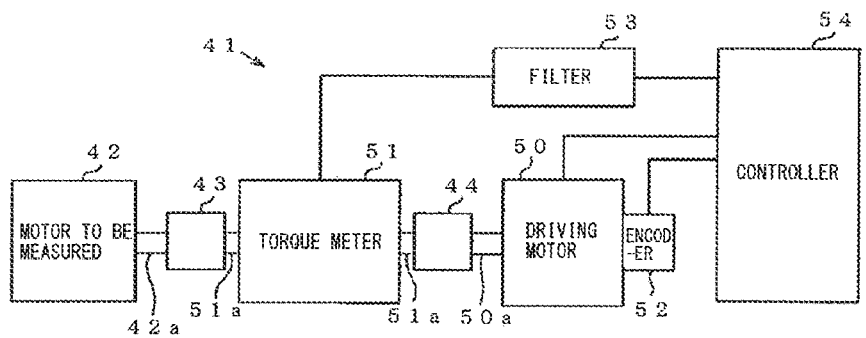
FIG. 5 shows a schematic configuration of a conventional cogging torque measuring apparatus.
Figure 6:
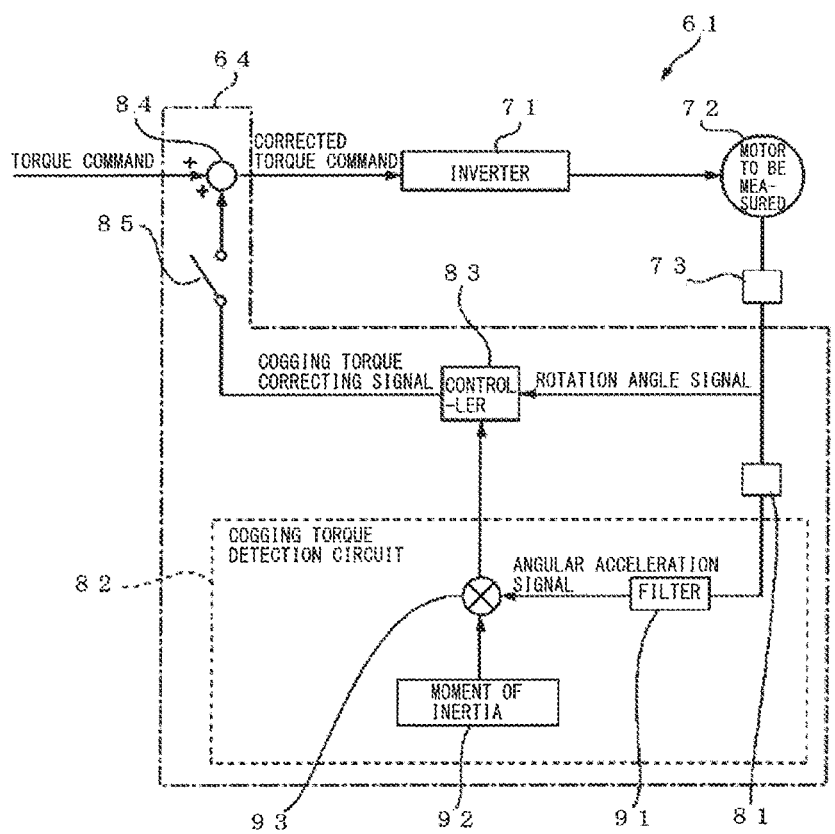
FIG. 6 shows a schematic configuration of another conventional cogging torque measuring apparatus.

Referring now to FIG. 4, the cogging torque measuring method according to a third embodiment of this invention is described. Again, the same components as those of the first embodiment are designated by the same reference numerals as those of the first embodiment, and the descriptions related to the components will not be repeated. In the third embodiment, a direct drive motor 14 used as the means for rotating the motor 2 to be measured, an encoder 15 used as a rotation angle detecting means for the direct drive motor 14, and a controller 17 for driving the direct drive motor 14 are additionally mounted. The output shaft of the motor 2 to be measured and the direct drive motor 14 are connected to each other through a coupling 16 in an integrally rotatable manner. The direct drive motor 14 is operated in accordance with a constant torque command issued from the controller 17, and the operation is transferred through the coupling 16 to the output shaft of the motor 2 to be measured for rotating the motor 2 to be measured in a non-energized state. The procedural steps for measuring the cogging torque other than that associated with the means for driving the output shaft are identical with those in the first embodiment, and their descriptions will not repeated.

According to the third embodiment, as distinct from the cogging torque measuring method described in JP 2006-220497 A, the motor to be measured is not connected via the torque meter to the driving motor. This can prevent the necessity of maintaining the moment of inertia of the driving motor much greater than that of the motor to be measured, so that the torque detection signal output from the torque meter is matched with the cogging torque as described in the BACKGROUND ART section, and, in turn, allows accurate measurement of the cogging torque in the smaller measuring apparatus.

What is claimed is:

1. A method for determining a cogging torque of a motor, comprising:
   manually applying a substantially constant rotation torque to an output shaft of the motor to rotate the output shaft of the motor without electrically energizing the motor;
   detecting, using a rotation angle detector, an angle of rotation of the output shaft of the motor at each of a plurality of angles of rotation;
   calculating an angular acceleration of the motor at each of the plurality of angles of rotation by second order differentiating the angle of rotation;
   calculating a torque value at each of the plurality of angles of rotation by multiplying the angular acceleration at each of the plurality of angles of rotation by a moment of inertia of a rotor in the motor;

obtaining a torque waveform in which the torque value at each of the plurality of angles of rotation is plotted as a function of the plurality of angles of rotation; and calculating a cogging torque component for each order of rotation based on a frequency of the torque waveform.

2. A method for determining a cogging torque of a motor, comprising:

attaching a weight to a tip of a wire that is wound around an output shaft of the motor, the weight being selected to exceed a static frictional torque of the output shaft of the motor;

rotating the output shaft of the motor without electrically energizing the motor by dropping the weight to pull the wire;

detecting, using a rotation angle detector, an angle of rotation of the motor at each of a plurality of angles of rotation;

calculating an angular acceleration of the motor at each of the plurality of angles of rotation by second order differentiating the angle of rotation;

calculating a torque value at each of the plurality of angles of rotation by multiplying the angular acceleration by a moment of inertia of a rotor in the motor;

obtaining a torque waveform in which the torque value at each of the plurality of angles of rotation is plotted as a function of the plurality of angles of rotation; and calculating a cogging torque component for each order of rotation based on a frequency of the torque waveform.

3. A method for determining a cogging torque of a motor, comprising:

directly connecting a direct drive motor to an output shaft of the motor;

rotating the output shaft of the motor without electrically energizing the motor by driving the direct drive motor in accordance with a constant torque command to make an output torque from the direct drive motor constant;

detecting, using a rotation angle detector, an angle of rotation of the motor at each of a plurality of angles of rotation;

calculating an angular acceleration of the motor at each of the plurality of angles of rotation by second order differentiating the angle of rotation;

calculating a torque value at each of the plurality of angles of rotation by multiplying the angular acceleration at each of the plurality of angles of rotation by a moment of inertia of a rotor in the motor;

obtaining a torque waveform in which the torque value at each of the plurality of angles of rotation is plotted as a function of the plurality of angles of rotation; and calculating a cogging torque component for each order of rotation based on a frequency of the torque waveform.

* * * * *